United States Patent [19]
Press

[11] Patent Number: 5,253,297
[45] Date of Patent: Oct. 12, 1993

[54] DATA PROCESSING SYSTEM WITH CRYPTOGRAPHIC FACILITY

[75] Inventor: James Press, Biggleswade, Great Britain

[73] Assignee: International Computers Limited, London, England

[21] Appl. No.: 874,734

[22] Filed: Apr. 27, 1992

[30] Foreign Application Priority Data

Jun. 12, 1991 [GB] United Kingdom .............. 9112644.1

[51] Int. Cl.$^5$ ............................................. H04L 9/00
[52] U.S. Cl. ........................................ 380/49; 380/9; 380/48; 380/50
[58] Field of Search .................... 380/9, 20, 21, 28–30, 380/43, 48–50

[56] References Cited

U.S. PATENT DOCUMENTS

| | | | |
|---|---|---|---|
| 4,882,752 | 11/1989 | Lindman et al. ................. | 380/49 X |
| 5,012,515 | 4/1991 | McVitie ............................. | 380/49 |
| 5,124,117 | 6/1992 | Tatebayashi et al. ............. | 380/21 |

FOREIGN PATENT DOCUMENTS 0447339 9/1991 European Pat. Off. .
0471939 2/1992 European Pat. Off. .

OTHER PUBLICATIONS

Snekkenes, "Exploring the BAN Approach to Protocol Analysis", IEEE Symposium on Security and Privacy, May 20–22, 1991, pp. 171–181.

Primary Examiner—Bernarr E. Gregory
Attorney, Agent, or Firm—Lee, Mann, Smith, McWilliams, Sweeney & Ohlson

[57] ABSTRACT

A cryptographic services facility uses object-oriented techniques to allow a user to interface with the facility in an algorithm-independent manner. The facility stores algorithm objects which specify algorithm attributes, and context type objects which specify user context attributes such as intended algorithm, intended use, key size and default key. In response to a "create context" request from a user, the context type objects are searched to find a context type that meets the user's requirements, and this is used to create a new context instance. In response to "create context type" requests from the system administrator, a context type factory object searches for an algorithm object that provides a required level of protection and uses this to create a new context type which is then available to users.

5 Claims, 2 Drawing Sheets

DATA PROCESSING SYSTEM WITH CRYPTOGRAPHIC FACILITY

BACKGROUND TO THE INVENTION

This invention relates to the provision of cryptographic facilities in a data processing system.

In order to be of wide use, a cryptographic facility should be designed so that it can support a range of different cryptographic algorithms. However, the users of such a facility do not normally wish to be concerned with details of the underlying cryptographic algorithms used by the facility, and most would not even wish to be concerned with the choice of cryptographic keys.

The object of the present invention is to provide a cryptographic facility which allows users to interface with the facility in an algorithm-independent manner. This permits application programs to be designed independently of the algorithms, and also allows algorithms to be modified without affecting the application programs.

SUMMARY OF THE INVENTION

According to the invention, there is provided a data processing system comprising a plurality of client units, and a cryptographic services facility for providing cryptographic services to the client units, wherein the cryptographic services facility comprises:

a) means for storing a plurality of context types, each of which specifies attributes for performing a particular class of cryptographic operation, b) means for creating a context instance as an instance of a specified context type, in response to a request from a client, and returning an identifier for this context instance to the client, and, c) means for performing cryptographic operations in response to a request from a client using a context instance specified by the client.

DESCRIPTION OF AN EMBODIMENT OF THE INVENTION

One embodiment of the invention will now be described by way of example with reference to the accompanying drawings.

The present system is implemented using a technique known as object oriented design, using the C programming language. For further details of object oriented design reference is made to "Object-Oriented Analysis", P Coad & E Yourdan, Prentice Hall (1991), and "Object-Oriented Design", P Coad & E Yourdan, Prentice Hall, 1991.

Conventional design methods are based on the use of functional decomposition, where large problems are broken into smaller ones by concentrating on dividing the major steps which appear in the flow of control. The main limitation of designs produced by such methods is that they are not particularly good at coping with change, which often accounts for the majority of a software system's life.

The main distinction between Object-Oriented Design (OOD) and conventional design is that it is object-oriented and not process-oriented.

Central to OOD is the concept of an 'object'. An object embodies an abstraction of information which is meaningful to its clients. It has the following properties:

a) An object has attributes specifying all the (usually static) properties and the current (usually dynamic) values of each of these properties.

b) An object has behaviour defined by the 'services' it provides to its clients (other objects or programs).

The terms 'operator' or 'method' are sometimes used instead of 'service'. Clients do not generally directly access the data in an object; they send 'messages' to the object requesting services to be carried out to access or manipulate the actual data in the object. The term 'request' is sometimes used instead of 'message'. A service may be classified as:

Modifier—alters the state of an object;
Selector—accesses the state of an object without modifying it;
Iterator—permits the parts of an object to be visited;
Constructor—creates an object initialising its state;
Destructor—destroys the object freeing its state.

In this way, objects provide information-hiding by data encapsulation. By avoiding direct client access to the data, a system can guarantee certain integrity constraints of the object. It is also possible to change the object implementation without affecting the clients, unless there is a change in the nature of the services provided.

c) An object has identity and is denoted by a name. To make a request, a client identifies the object which is to perform the service and names the request. Requests may take arguments (including references to other objects) and the service may return one or more results.

d) An object is an instance of some class. A class contains a common structure and a common behaviour applicable to all instances of the class. Classes can be derived from other classes (inheritance).

Figure 1:
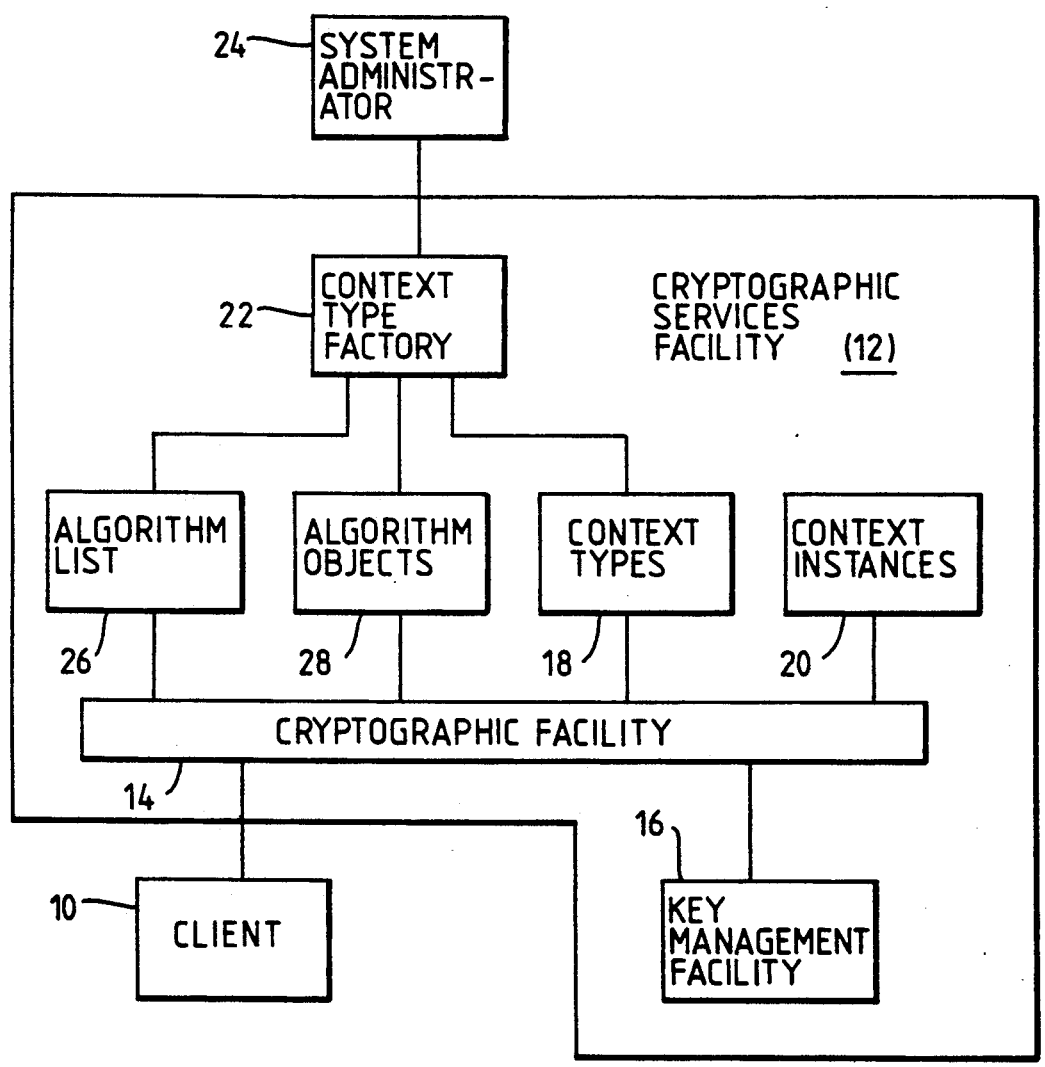
FIG. 1 is a schematic block diagram of a system in accordance with the invention.

Referring to FIG. 1, the data processing system includes a number of clients 10 (only one shown) which require to use cryptographic facilities to protect data. The clients 10 are application programs which perform a particular function in the system. The structure of these application programs forms no part of the present invention, and so will not be described herein.

The system also comprises a cryptographic support facility (CSF) 12, which includes a cryptographic facility (CF) 14, and a key management facility (KMF) 16.

The key management facility (KMF) 16 is a software component which provides cryptographic key generation and deletion facilities. These facilities can be used either by the clients or by the CF. The KMF is also responsible for managing a key store which stores long-term keys.

The CF 14 is a software component which provides cryptographic services for the client 10, in response to calls from the clients. As will be described, the CF provides a standard interface to the clients, making cryptographic services available in a consistent manner, such that the client need not have knowledge of the underlying mechanism used to achieve these services.

In this example, the services provided by the CF are:
data encipherment
data decipherment
one-way encipherment of data
creation of cryptographic contexts deletion of cryptographic contexts The CF has access to a context type store 18 which holds a number of objects referred to as cryptographic context types. Each of these context types contains a number of attributes as follows.

Identifier: an identifier for the context type.

Intended algorithm: the identity of a cryptographic algorithm

Intended use: the intended functionality of the algorithm (i.e. confidentiality, or one-way encipherment).

Algorithm mode: the mode of operation of the algorithm (e.g. cipher block chaining).

Key size: the size of the key required by the intended algorithm.

Default key: a default key which can be used with the intended algorithm.

Default IV: a default initialization vector format which can be used for initialising the algorithm.

Strength of protection: the sensitivity level of data that can be protected by the algorithm (e.g. secret, confidential).

Other parameters: other optional parameters for the algorithm.

The CF also has access to a context instance store 20 which contains a number of objects referred to as context instances. As will be described below, a context instance can be created from a context type by selecting a particular key and (optionally) a particular initialization vector for that context instance. Thus, it can be seen that a context type effectively acts as a generator for creating context instances.

The cryptographic support facility also includes an object referred to herein as a context type factory 22. This provides a service to the system administrator 24, to allow the administrator to create new context types when required.

The cryptographic support facility also includes an algorithm list 26 which contains references to all the cryptographic algorithms supported by the system.

Each algorithm is encapsulated by means of an algorithm object 28 which contains the following attributes:

KeySize the size of key value normally required, or the minimum and maximum sizes if a range is supported.

KeyFormat: specifies any formatting required of key values: none, odd parity on octets or even parity on octets.

IvSize: the size of the IV value normally required, or the minimum and maximum sizes if a range is supported.

Generator: the type of key generator that can be used for this algorithm: generic or specialised.

CryptoType: whether the algorithm is symmetric or asymmetric.

ConfigInfo: information about how the algorithm can be configured to provide different qualities of service. A quality of service (QOS) comprises a particular functionality (i.e. confidentiality or one-way encipherment) and a particular strength of protection. For each quality of service that can be supported, the following is held:-

Mode: the mode of operation;

KeyReqd: whether a key is required and, if so, its size for the standard configuration if KeySize indicates a range;

IvReqd: whether an IV is required and, if so, its size for the standard configuration if IvSize indicates a range;

OtherParams: a sequence of octets containing other algorithm-specific parameters required for the standard configuration;

ParamForm: the format of parameters if a non-standard configuration can be supported. This includes:
* the range in key size (a subrange of KeySize).
* the range in IV size (a subrange of IvSize).
* for each 'other' parameter: the type of parameter, its length (in octets) and its range of possible values.

Each algorithm object also contains the following services:

ConfigDetails:

locates the entry in ConfigInfo for the specified quality of service and mode or key size, if specified.

if KeyReqd true and KeySize is not a range, return the value of KeySize. Otherwise return the value of KeyReqd.

if IvReqd is true and IvSize is not a range, return the value of IvSize. Otherwise return the value IvReqd.

Return the values of the remaining field of the entry.

SupportedQos:

checks CongifInfo to see if the specified quality of service and mode or key size, if specified, can be supported.

returns the result of the check.

A client can make a number of function calls to the CF, including CreateContext, DeleteContext, Encrypt, Decrypt and One-Way Function, as will now be described.

Figure 2:
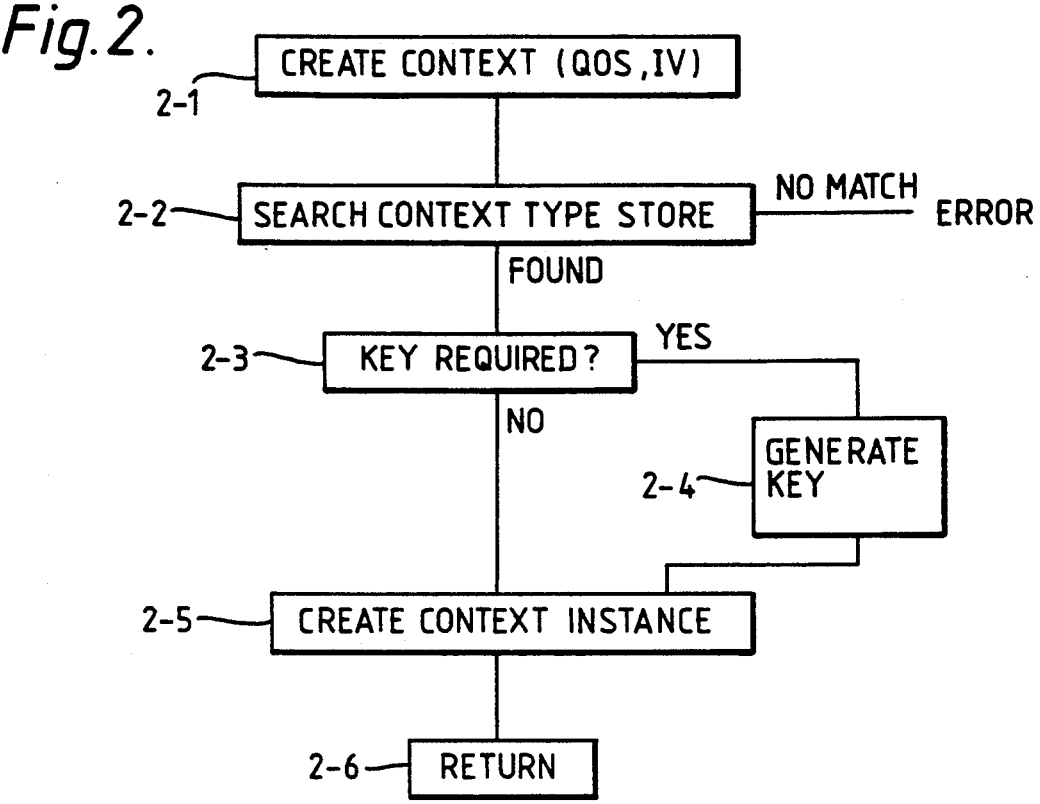
FIG. 2 is a flow chart illustrating the operation of the system in creating a context instance.

Create Context (FIG. 2)

(2-1) This call requests the CF to create a context instance for use by the client. The call includes as parameters: the quality of service (QOS) required by the client and an indication of the initialization vector (IV) to be used in creating the context instance.

(2-2) When the CF receives this call, it searches the context type store to find a context type appropriate to the quality of service specified in the call. If no suitable context type is found, an error return is made.

(2-3) The CF then checks whether the algorithm requires a key.

(2-4) If the algorithm requires a key, then the CF selects or generate a suitable key, or uses a default value if one is supplied in the context type.

If an IV is required by the algorithm, but no IV has been supplied by the client, then the CF will generate an appropriate value, or use a default value if one is supplied in the context type.

(2-5) The CF then uses the context type to generate a context instance and places it in the context instance store.

(2-6) Finally, the CF returns a context identifier to the client, indicating the identity of the newly created context instance.

A client may establish any number of context instances at a time. Each instance is given a unique identifier to allow the client to refer to it again in subsequent operations.

A context instance is available only to the client that creates it, and cannot be shared. Hence, if two clients wish to establish a cryptographic channel to allow them to communicate with each other, they must both create identical or compatible context instances.

Delete Context

This call requests the CF to delete or release a previously created context instance. The call contains a parameter specifying the identity of the context instance.

A context instance can be deleted only by the client that created it. Any keys or initialization vectors associated with the context instance will also be deleted.

Encrypt

This call requests the CF to encipher specified data, using a specified context instance. The call contains as parameters: the identity of the context instance to be used; a pointer to the data to be enciphered; and an indication of the length of the data.

In response to this call, the CF accesses the specified context instance to obtain the identity of the algorithm, the key, the initialization vector and the mode of operation of the algorithm to be used in enciphering the data.

The CF checks that the intended use of the identified context instance is for confidentiality. Assuming that this check is satisfactory, the CF then enciphers the data, and places the enciphered data in an allocated buffer area. Finally, the CF returns to the client a pointer to this buffer area, and an indication of the length of the enciphered data.

It should be noted that the actual algorithm used is transparent to the client.

Decrypt

This call requests the CF to decipher specified encrypted data, using a specified context instance. The call contains as parameters: the identifier of the context instance to be used; a pointer to the data to be deciphered; an indication of the length of the data.

In response to this call, the CF accesses the specified context instance to obtain the identity of the algorithm, the key, the initialization vector and the mode of operation of the algorithm to be used in deciphering the data.

The CF checks that the intended use of the identified context instance is for confidentiality. Assuming this check is satisfactory, the CF deciphers the data and places the decrypted data in an allocated buffer area. Finally, the CF returns to the client a pointer to this buffer area, and an indication of the length of the decrypted data.

It should be noted that the actual algorithm used is transparent to the client.

One-Way Function

This call requests the CF to perform a one-way encipherment of specified data, using a specified context instance. It uses a one-way function to transform the data in such a way that it is computationally infeasible to invert the function.

The call contains as parameters: the identifier of the context instance to be used; a pointer to the data to be enciphered; and the length of the data.

In response to this call the CF accesses the specified context instance to obtain the identity of the algorithm. The CF checks that the intended use of the context is for one-way encipherment. Assuming this is satisfactory, the CF applies the algorithm to the data and places the enciphered data in an allocated buffer area. Finally, the CF returns to the client a pointer to this buffer area.

Again, the actual algorithm is transparent to the client.

Context Type Factory

Figure 3:
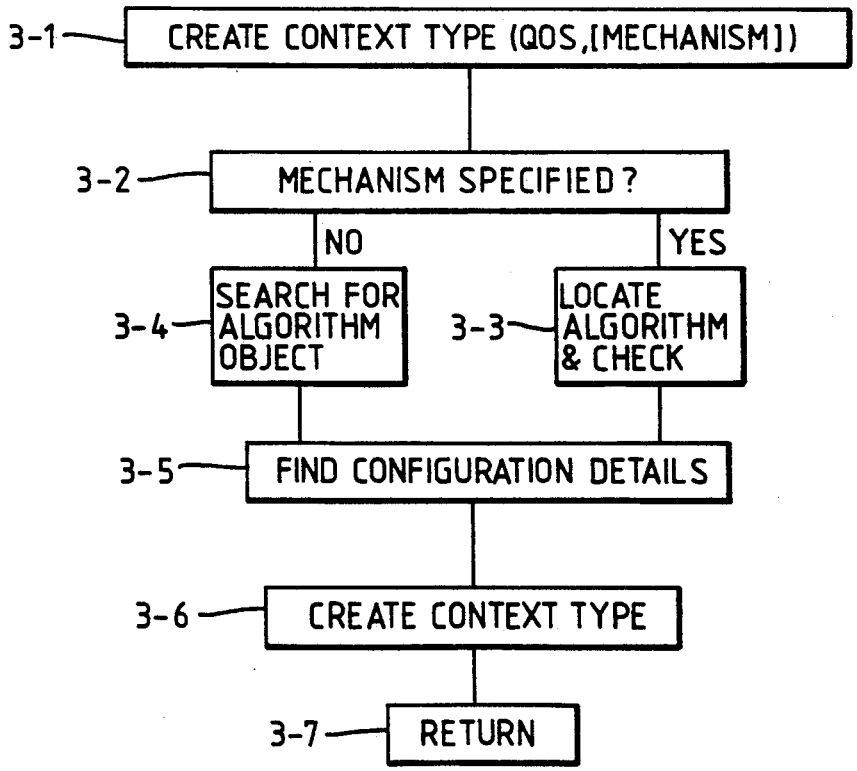
FIG. 3 is a flow chart illustrating the operation of the system in creating a context type.

The operation of the context type Factory 22 will now be described with reference to FIG. 3. As already mentioned, the context type factory provides a service to enable the system administrator 24 to create new context types.

(3-1) When it is required to create a new context type, the system administrator makes a Create Context Type call to the content type factory. The call includes as parameters the required quality of service QOS (i.e. level of strength and the intended functionality) of the context type. Optionally, the call may also specify a particular cryptographic mechanism (i.e. algorithm and mode or key size).

(3-2) The context type factory first checks whether a particular mechanism (algorithm and mode or key size) has been specified.

(3-3) If a mechanism has been specified, a call is made to the supported algorithm list 26 to locate the specified algorithm. A check is made to ensure that the algorithm can support the required quality of service, using the SupportedQos service of the algorithm.

(3-4) If no mechanism was specified, the context type factory calls the supported algorithm list 26 to search for an algorithm capable of supporting the required quality of service. If no such algorithm can be located, an error return is made.

(3-5) Assuming that a suitable algorithm has been found at step 3-3 or step 3-4, the context type factory then uses the ConfigDetails service of the algorithm to locate the entry in the ConfigInfo attribute of the algorithm for the specified quality of service (and mode or key size if specified).

(3-6) The context type factory then creates a context type and adds it to the context type store. The intended use and strength of protection attributes of the context type are set to the values specified by the QOS parameter in the Create Context Type call. The intended algorithm attribute of the context type is set to the identity of the located algorithm object. The mode, key size, default IV formats and other parameters attributes of the context types are set to values obtained from the ConfigInfo attribute of the located algorithm object. The default key option attribute of the context type is set as specified by the administrator or, if none was specified, a default key option is generated.

(3-7) Finally, the context type factory returns the identity of the newly created context type to the system administrator.

Summary

In conclusion, it can be seen that the system described above provides a number of predefined context types for the creation of context instances. Each context instance contains all the information required to perform cryptographic services to be made available to clients in a manner such that the client need not have any knowledge of the particular characteristics of the underlying cryptographic algorithms, and need not have knowledge of the values of the cryptographic keys. It also ensures that algorithms and keys are used in a controlled manner, in accordance with the security policy of the system. Moreover, it ensures that appropriate levels of protection are applied to data of different sensitivity levels.

I claim:

1. A data processing system comprising a plurality of client units, and a cryptographic services facility for providing cryptographic services to the client units, wherein the cryptographic services facility comprises:
   a) means for storing a plurality of context types, each of which specifies attributes for performing a particular class of cryptographic operation, and
   b) means for creating a context instance as an instance of a specified context type, in response to a request from a client unit, and for returning an identifier for this context instance to the client unit.

2. A system according to claim 1 wherein each context type contains at least a reference to a particular cryptographic process.

3. A system according to claim 1 wherein the cryptographic services facility includes means for checking whether the context instance specified by the client is suitable for a particular cryptographic operation requested by the client.

4. A system according to claim 1 wherein the means for creating a context instance includes means for inserting a specified cryptographic key value and selected initialization value in the context instance.

5. A system according to claim 1 wherein the cryptographic services facility comprises:
   a) means for storing a plurality of configuration objects, each including configuration information for each of a plurality of different levels of protection, and
   b) context type creation means responsive to a request specifying a required level of protection for locating a configuration object capable of providing the required level of protection and for creating a context type using the configuration information associated with that configuration object for the required level of protection.

* * * * *